Dec. 30, 1947. V. GUILLEMIN, JR 2,433,513
CONTROLLER AND INDICATOR FOR BRIEF ELECTRIC CURRENTS
Filed Feb. 11, 1942

Inventor
Victor Guillemin, Jr.

Patented Dec. 30, 1947

2,433,513

UNITED STATES PATENT OFFICE 2,433,513

CONTROLLER AND INDICATOR FOR BRIEF ELECTRIC CURRENTS

Victor Guillemin, Jr., Dayton, Ohio

Application February 11, 1942, Serial No. 430,394

10 Claims. (Cl. 128—419)

The present invention has for an object to provide apparatus by which convenient accurate control may be had of the duration and magnitude of electric currents applied to any system for a brief time, and to give an indication of the applied current magnitude on a direct reading instrument at leisure in spite of the fact that the duration is too brief to afford such an indication when applied in the usual way. By a "brief time" is meant a time too short for an ordinary pointer type current or voltage indicating instrument, such as a D'Arsonval ammeter of the usual kind, to come to equilibrium and give a correct reading. Also, "brief time" is a time so short that if a current were turned on and found to have a value different from the intended one, appropriate adjustments could not be made in the available time.

A further object is to provide an apparatus of the type hereinbefore noted whereby it may be made certain that the current will have the intended magnitude during such "brief time" even though the resistance of the system to which the current is applied is variable or of such a nature that the resistance during the brief time of current flow cannot be determined by measurement made beforehand.

A further object is to provide means for controlling an electrical current, either direct or alternating, in such a way that the magnitude of the current will remain substantially constant when the resistance (or impedance) of the system through which the current is passed varies over wide limits, and which will have the additional property that, in the case of alternating current, both half cycles will have identical instantaneous values throughout.

The apparatus may be used in any commercial application where the heating effect (including welding), the electrolytic or chemical effect, or the magnetic effect of a brief current is to be closely controlled.

A very definite use and for which the apparatus herein shown has been particularly designed, is in the application of currents to persons suffering from various pathological conditions, for therapeutic purposes. For this reason the system to which the current is applied will be called for convenience the "subject," but it should be understood that this term is not used by way of limitation but only by way of example.

For a more complete understanding of this invention, reference may be had to the accompanying drawings in which Figure 1 is a wiring diagram of a constant current source which may be employed.

Figure 6 is a detail section on line 6—6 of Figure 5.

Figure 7 is a schematic diagram of the apparatus to which current may be applied from any of the constant current sources such as are illustrated, for example, in Figures 1 to 3, inclusive.

Figure 8 is a detail section on line 8—8 of Figure 5.

Two important features of the present apparatus are: (1) the use of a so-called "constant current source," that is, a source which will cause an essentially constant current to flow through the subject even though his resistance may vary between wide limits; (2) the method of applying the current to the subject, not as is usually done by turning it on for a brief time and then off again, but rather by allowing it to flow at first through a "dummy" subject, where it may be adjusted and measured at leisure, and then transferring it for a brief time to the real subject and back again to the dummy. Because of the constant current source the current will not vary appreciably during the transfer even if the resistance or impedance of the subject is not the same as that of the dummy.

The transfer of current to and from the subject is done by an automatic timer under the control of the operator as will later more fully appear.

The constant current source

Figure 1:
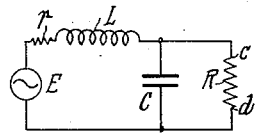
Figure 2:
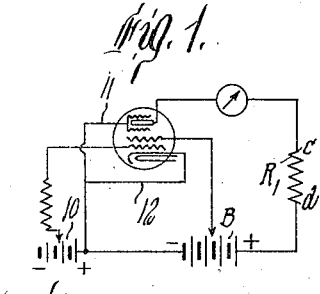
Figures 2 and 3 are wiring diagrams of different constant current sources applicable to the invention.
Figure 3:
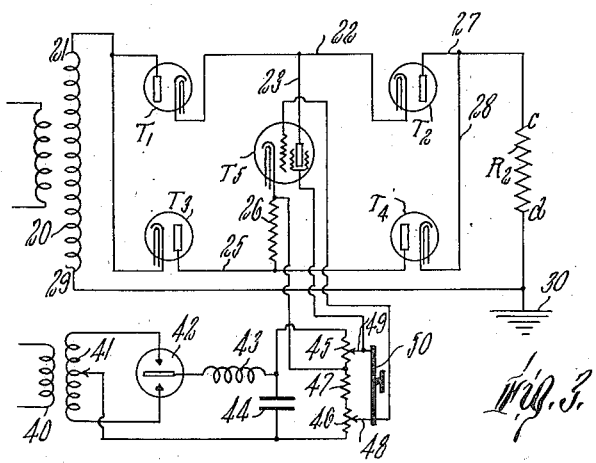

Types of constant current source which do not have the disadvantages of high potential and power waste characteristic of a fixed resistance high compared with that of the subject and in series therewith are shown in Figures 1 to 3 of the accompanying drawings. The form shown in Figure 1 is suitable only for alternating current of at least approximately sinusoidal wave form. It consists of an inductance L and a capacity C connected in series to a source of alternating current of potential E and a frequency $f$. A load resistance R, in the present case the dummy or the subject, is connected in parallel with the capacity C. With this arrangement the current I through R is given by $$I = \frac{E}{2\pi fjL + 1/(2\pi fjC + 1/R)} \times \frac{1/R}{2\pi fjC + 1/R}$$

If the values of L and C are chosen so that $4\pi^2 f^2 LC = 1$, this reduces to:

$$I = E/2\pi fjL \text{ (where } j = \sqrt{-1}\text{)}$$

that is, I is independent of the value of R, and the circuit of Figure 1 is a constant current source.

In practice it is not possible to have an inductance L in the circuit without having some resistance in series with it, since the windings of any physical inductance coil would necessarily have some resistance. This has been indicated in the diagram of Figure 1 by the resistance $r$. Actually it is desirable to have resistance in series with the inductance L for without it the potential across R would rise theoretically to infinity if R were infinite, and in practice the potential would rise to an undesirable value. This is prevented by introducing the resistance $r$ in series with the inductance L. With the proper value of this resistance $r$, the current will remain practically constant over the expected range of variation of R, but will decrease as R increases above this range so that the potential difference across R will never exceed a predetermined safe maximum. The magnitude of the current I may be adjusted by varying the supply potential E.

The manner of utilizing a constant current source such as shown in Figure 1 will be more fully described later, it being sufficient for the present to note that the subject or the dummy represent the load resistance R and means are provided for introducing such load between the points $c$ and $d$ at opposite ends of the resistor R and in place thereof.

Other forms of constant current source are shown in Figures 2 and 3, both depending upon the fact that in certain electron valves, power pentode or beam power tetrode tubes, the plate current is nearly constant over a wide range of plate potential, but the plate current may be controlled by adjusting the control grid or the screen grid potential, or both. Figure 2 shows the use of such an electron valve where the current source is direct current, in which case such a tube may be used very simply to produce a constant current source for a load of variable resistance. The load indicated in this figure as $R_1$ is merely arranged in series with the tube, being shown as in the plate circuit which derives its potential from the direct current source B. As this load resistance increases, the potential drop across it increases also, thus decreasing the potential drop across the tube. This, however, does not change the current appreciably, which means in effect that the resistance of the tube has decreased. The total resistance of tube and load thus remain substantially constant and the current remains constant also. As shown the potential of the tube may be varied from the direct current source 10, this acting to vary the current flow through $R_1$ continuously from zero to maximum. The screen of the tube is shown as connected variably to the battery B and the suppressor is connected through the lead 11 to a point between the battery B and the grid voltage supply 10 and is also connected through the lead 12 to the tube cathode. The load, whether the dummy or the subject, will of course be represented by the resistance $R_1$, the connections to the controlling apparatus for switching between the dummy and the subject being at $c$ and $d$.

Figure 3 shows the employment of an electron valve for use with an alternating current supply, in which case the circuit is more complicated, for the electron valve or tube conducts in one direction only, while the current must flow in both directions. Figure 3 shows a type of circuit which has the important advantage that although the current flows in both directions through the load $R_2$, it flows in only one direction through the current controlling tetrode. This insures that both directions of current flow through the load are quite symmetrical, that is, that both half cycles will have identical instantaneous values throughout.

Alternating potential is supplied through the high potential secondary 20 of a transformer, and half wave rectifiers, shown as of the ordinary diode type, are employed in connection with it, such rectifiers being shown at $T_1$, $T_2$, $T_3$ and $T_4$. These rectifiers are arranged in pairs, the rectifiers of each pair being arranged back to back, that is, from the end 21 of the transformer secondary 20 connections are made to the plate of the rectifier $T_1$, while the anodes of the rectifiers $T_1$ and $T_2$ are connected together through the lead 22 and through the lead 23 to the plate of the tetrode tube T5. The end 21 of the transformer secondary is connected to the cathode of the rectifier $T_3$ and the plates of the rectifiers $T_3$ and $T_4$ are connected together through the lead 25 and through the resistor 26 to the cathode of the tetrode T5. The plate of the rectifier $T_2$ and the cathode of the rectifier $T_4$ are connected together through the leads 27 and 28. The opposite end 29 of the transformer 20 is connected to ground at 30 and through the load resistance $R_2$ to the leads 27 and 28 and thus to the plate of the rectifier $T_2$ and the cathode of the rectifier $T_4$. The tube T5 is shown as a beam power tetrode although it might, if desired, be a power pentode amplifier tube.

The power control of the tube T5 through its grid and screen grid is produced from the transformer 40 having a high potential secondary 41 which feeds into a standard full wave rectifier 42 with an inductance 43 and a capacity 44 to reduce ripple. It delivers current from across the condenser 44 to two variable potential dividers 45 and 46 joined by a fixed resistor 47. The grid of the tube T5 is connected to the slide 48 of the potential divider 46, while the screen grid is connected to the slider 49 of the potential divider 45 and these sliders are joined together for simultaneous motion by a common actuating element 50.

In operation, when the end 21 of the transformer secondary 20 is positive, the current takes the path from 21 through the rectifier $T_1$, the power tube T5, the rectifier $T_4$, lead 28, through the load resistor $R_2$ to ground and to the opposite end 29 of the transformer secondary 20. When the end 29 of this secondary is positive, the current path is from 29 through the resistor $R_2$ from $d$ to $c$ through the rectifier $T_2$, power tube T5, rectifier $T_3$ back to the transformer secondary end point 21. Thus the current is unidirectional through power tube T5 but is alternating through the load $R_2$.

The magnitude of the current flow is adjusted by means of the voltage dividers 45 and 46, which vary the positive and the negative potentials, respectively, of the screen grid and control grid relative to the cathode of the power tube T5. The fixed resistor 47 limits the negative control grid potential to a safe minimum value.

As before the load $R_2$ represents either the dummy or the subject, the connections to the apparatus for switching from one to the other being at the points $c$ and $d$ in place of the resistor $R_2$.

*The automatic timer*

Figure 4:
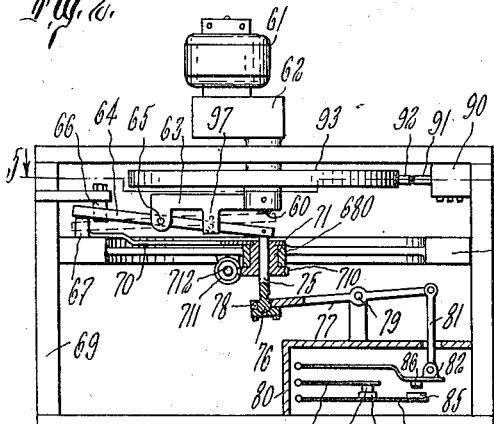
Figure 4 is a view partly in side elevation and partly in section of a timer switch mechanism which may be employed.
Figure 5:
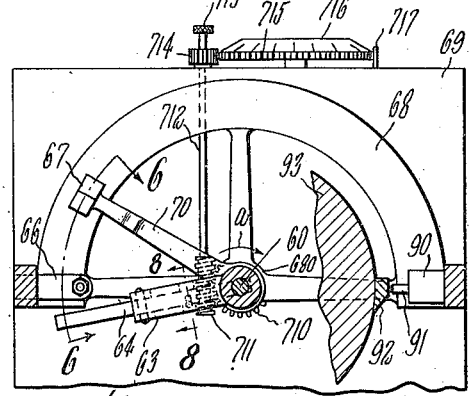
Figure 5 is a detail section on line 5—5 of Figure 4.

The duration of the time interval during which the current is switched from the dummy to the subject is controlled by an automatic timer whose action may be started manually by the operator, the time interval being adjustable. One form of timer is shown in Figures 4 to 6, inclusive. A shaft 60 driven in the direction of the arrow *a* of Figure 5 by a constant speed motor 61 through a suitable reduction gear device at 62, carries an arm 63 upon which a lever 64 is fulcrumed at 65 so that it may be swung between the full and dotted line positions shown in Figure 4. At 66 and 67 are two cam elements, the cam element 66 being positioned to contact with the outer end of the lever 64 and cause it to be depressed to the dotted line position of Figure 4 while the element 67, arranged further around in the direction of rotation of the arm 63, is positioned beneath the outer end of the lever 64 in position to return the lever 64 to its full line position as the shaft 60 continues to rotate. The cam element 67 is mounted for adjustment in an arcuate path coaxial with the shaft 60, being supported by a segment 68 fixed horizontally in any suitable manner in a supporting frame 69.

This cam element 67 is shown as carried by an arm 70 fixed to the hub 71 of a worm gear 710 journaled in a hub 680 of the segment 68. A worm 711 on an actuating shaft 712 having a knob 713 by which it may be rotated meshes with the worm gear 710. The shaft 712 may be connected through pinion 714 and gear 715 to a dial 716 provided with suitable time indications, such as fractions of a second, thereon, cooperating with a fixed pointer 717. The angular spacing between the cam elements 66 and 67 may thus be adjusted by rotating the knob 713.

The inner end of the lever 64 has a link 75 pivoted thereto provided with a ball end 76, this link being mounted substantially coaxial with the shaft 60 and extending through the hub 71, so that the ball end 76 rotates about a fixed axis through its center as the shaft 60 is rotated. A lever 77, provided with a ball socket 78 for receiving the ball 76, is fulcrumed at 79 on a switch supporting stand 80, and the outer end of the lever 77 is connected through a link 81 to the top spring leaf 82 of a make-before-break switch, which also includes a lower spring leaf 83 and an intermediate spring leaf 84. The inner ends of each of these leaves is fixed but the outer ends may flex.

The top leaf 82 and the lower leaf 83 have cooperating contacts 85 and 86, which on the depression of the link 81 from the position shown in Figure 4, first make contact between these leaves 82 and 83, further downward motion of the link 81 flexing the leaf 83 downwardly and breaking contact between the contact elements 87 and 88 of the intermediate and lower leaves 84 and 83. On returning the link 81 to its position shown in Figure 4, the first action is to make contact between the contact elements 87 and 88 and then to break contact between the contact elements 85 and 86. At 90 is shown a switch having an actuating element 91 adapted to be contacted and thrown by a cam element 92 carried by a disk 93 fixed to the shaft 60. By angular adjustment of the cam element 67 the time interval during which the arm 64 is held in its dotted line position of Figure 4 in which the contact elements 85 and 86 are closed and the contact elements 87 and 88 are open may be adjusted, and this time interval determines the time during which the current is supplied to the subject rather than to the dummy, as will later appear. The motor 61 is started by a manually operated switch as will also appear. Means may be provided for frictionally holding the lever 64 in either its full line or dotted line positions. As shown best in Figure 8, this means may comprise a spring pressed latch ball 95 carried by the lever 64 in position to engage in either of a pair of depressions 96 in a slotted bracket portion 97 of the arm 63.

Circuit diagram

Figure 7 is a schematic diagram of the apparatus. The constant current source, which may be of any of the types hereinbefore indicated, is connected in at the points *c* and *d*, corresponding to the similar points in the diagrams Figures 1, 2 or 3. Associated with the supply circuit is a controller 100 having a suitable knob 101 by the rotation of which the current derived from the source may be controlled as is well known in the art, the particular controller depending upon the type of constant current source. For example, in Figure 1 it will control the voltage from the alternating source E, in Figure 2 it will control the voltage derived from the direct current source 10, and in Figure 3 it will move the slider 50. From the terminal *d* the current passes through an ammeter 105, which may be of the usual pointer type, to the switch leaf 83. This switch leaf 83 is normally in electrical connection through the intermediate switch leaf 84, which directs current through the lead 106 and the dummy 107 to the line 108 leading to the terminal *c*. When the switch is actuated by depression of the link 81 the contact is first closed between the switch leaf 83 and the switch leaf 82 so that a connection is made through the switch leaf 82, through the lead 109, the subject 110, to the lead 108 and back to the terminal *c*. After this circuit is closed through the subject, further flexing of the switch leaf 82 in the same direction breaks the contact between the switch leaves 83 and 84 so that the entire current then passes through the subject, the dummy being out of the circuit. At the end of the time interval for which the apparatus has been set, the switch leaf 82 is again actuated, first to close the circuit between the leaves 83 and 84 so as to re-establish the circuit through the dummy 107, after which the circuit is broken between switch leaf 82 and 83, so that the subject is no longer interposed in the circuit. The switch 90, which acts to stop the motor 61, is shown of the double throw ratchet type in which successive motions of the actuating element 91 throw the blade alternately between terminals 111 and 112 which are connected to terminals 113 and 114, respectively, of the manually operated switch 115. This manually operated switch is of the same type as the switch 90. Thus in the position shown in Figure 7 with the switches 90 and 115 in the position shown, the motor is energized, the terminal 114 of the switch 115 being electrically connected to the terminal 112 of the switch 90. When the motor has been in operation for a sufficient length of time to bring the actuating element 92 into position to actuate the switch 90, the contact 112 is opened and the contact at 111 is closed. As the contact 113 of the switch 115 is now open, however, this causes the motor 61 to stop. The next actuation of the manually operated switch 115 closes the contact 113, starting the motor 61 and this continues until the contact 110 is opened, at which time contact 112 is closed, as shown in Figure 7. The contact 114 then being open, however, the motor stops.

Since the connection to the subject is closed before the dummy is cut out, and the connection to the dummy is closed before the subject is cut out, the current is not interrupted and no sparking at the contacts occurs. During the switching operation the current is held constant in spite of resistance changes, the reading of the ammeter 105 remaining steadfast.

The duration of the time during which the current is flowing through the subject is determined by the angular setting of the cam element 67. Thus the operator can control both the magnitude and duration of the current through the subject. The reading of the ammeter shows him that the apparatus is working properly, both immediately before and after the application of the current to the subject, and the presence of the constant current source makes certain that the applied current has the intended magnitude.

From the foregoing description of certain embodiments of this invention, it should be evident to those skilled in the art that various modifications might be made without departing from the spirit or scope of this invention.

I claim:

1. In combination, a constant current source, a circuit supplied with current from said source, a load comprising means for including a subject in the load circuit, a dummy, a switch mechanism actuable to switch said load into said circuit and then said dummy out of said circuit and after a brief interval to switch said dummy into said circuit and then said load out of said circuit, means for actuating said mechanism to perform the cycle specified, and means for adjusting the current in said circuit.

2. In combination, a constant current source, a circuit supplied from said source, a load comprising means for including a subject in the load circuit, a dummy, a switch actuable to interpose either said load or said dummy in said circuit, a switch actuating mechanism comprising a pivotted arm rotatable about an axis eccentric and transverse to the pivot of said arm, a member movable in said axis and connected to said arm to be moved by the pivotal motion of said arm, elements arranged in the path of motion of said arm as it is rotated about said axis to swing said arm about its pivot, operative connections between said member and said switch causing axial motion of said member to change said switch from one to the other of its positions in one of which said dummy is interposed in said circuit and in the other of which said load is interposed in said circuit and through an intermediate position where load and dummy are interposed in parallel in said circuit, and means for rotating said arm.

3. In combination, a current source, a circuit supplied from said source, a load comprising means for including a subject in the load circuit, a dummy, a switch actuable to interpose either said load or said dummy in said circuit, a switch actuating mechanism comprising a pivoted arm rotatable about an axis eccentric and transverse to the pivot of said arm, a member movable in said axis and connected to said arm to be moved by the pivotal motion of said arm, elements arranged in the path of motion of said arm as it is rotated about said axis to swing said arm about its pivot, operative connections between said member and said switch causing axial motion of said member to change said switch from one to the other of its positions in one of which said dummy is interposed in said circuit and in the other of which said load is interposed in said circuit and through an intermediate position where load and dummy are interposed in parallel in said circuit, means for rotating said arm, and means for adjusting the angular spacing of said elements to thereby adjust the relative lengths of time said switch remains in certain of its positions.

4. In combination with an electron valve of a type wherein the plate current is substantially constant during wide fluctuations of the plate voltage and provided with an anode plate and grid, a source of alternating potential, two pairs of half wave rectifiers, the rectifiers of each pair being arranged back to back, the rectifiers of one pair being arranged to supply direct current plate voltage during opposite half cycles of the alternating current wave, one direct from said power source and the other through a load, and the other rectifiers to receive voltage and current from the anode of said valve on opposite half cycles of the alternating current, one direct and the other through said load, whereby the current through said valve is in one direction while in alternating directions through said load, and means for controlling the magnitude of such current flow.

5. In combination with an electron valve of a type wherein the plate current is substantially constant during wide fluctuations of the plate voltage and provided with an anode plate and grid, a source of alternating potential, two pairs of half wave rectifiers, the rectifiers of each pair being arranged back to back, the rectifiers of one pair being arranged to supply direct current plate voltage during opposite half cycles of the alternating current wave, one direct from said power source and the other through a load, and the other rectifiers to receive voltage and current from the anode of said valve on opposite half cycles of the alternating current, one direct and the other through said load, whereby the current through said valve is in one direction while in alternating directions through said load, means for controlling the magnitude of such current flow, said load comprising selectively either a subject or dummy, and means for switching such selection during operation of said valve.

6. In combination, an alternating current source, means for deriving a constant alternating current from said source in which both half cycles have identical instantaneous values throughout, a load comprising means for including a subject in the load circuit, a dummy, means for selectively subjecting either said load or said dummy to current flow from said deriving means, and means for adjusting the magnitude of said current flow while flowing through said dummy only.

7. In combination, an alternating current source, means for deriving a constant alternating current from said source including an electron valve and means for directing opposite half cycles of said alternating current through said valve to thereby insure that both directions of current flow are symmetrical, a load comprising means for including a subject in the load circuit, a dummy, means for selectively subjecting either said load or said dummy to current flow from said deriving means, and means for adjusting the magnitude of said current flow while flowing through said dummy only.

8. In combination, a constant current source, a circuit supplied from said source, means for adjusting the value of said current, a load comprising means for including a subject in the load circuit, a dummy, a movable mechanism, means for moving said mechanism through a cycle of operations, and means for automatically stopping the motion of said mechanism when said cycle has been completed, said mechanism having means for interposing said dummy in said circuit at the start and end of said cycle, and having means for interposing said load in said circuit and then actuating said first mentioned interposing means to cut said dummy out of said circuit, then after a predetermined time interval actuating said first mentioned interposing means to interpose said dummy back into said circuit and thereafter cutting said load out of said circuit.

9. In combination, a constant current source, a circuit supplied from said source, a pair of electrodes for application to a patient to include the patient in a load circuit including said electrodes, a dummy, a switch for interposing either said load circuit or said dummy in said first mentioned circuit, means for adjusting the value of said current, and a timing device for actuating said switch to change the current from said dummy to said load circuit and there retain said current for a predetermined time.

10. In combination, a constant current source, a circuit supplied from said source, a pair of electrodes for application to a patient to include the patient in a load circuit including said electrodes, a dummy, a switch for interposing either said load circuit or said dummy in said first mentioned circuit, means for adjusting the value of said current, and a timing device for actuating said switch to change the current from said dummy to said dummy and said load circuit in parallel, then to cut out said dummy so as to pass the electric current through said load circuit for a predetermined time, to then reinterpose said dummy in parallel with said load circuit and then to cut out said load circuit to cause said current to flow through said dummy only.

VICTOR GUILLEMIN, Jr.

REFERENCES CITED

The following references are of record in the file of this patent:

UNITED STATES PATENTS

| Number | Name | Date |
|---|---|---|
| 2,162,530 | Dawson | June 13, 1939 |
| 2,178,827 | Bowie | Nov. 7, 1939 |
| 2,182,223 | Dobert | Dec. 5, 1939 |
| 2,217,476 | Gulliksen | Oct. 8, 1940 |

FOREIGN PATENTS

| Number | Country | Date |
|---|---|---|
| 509,472 | Great Britain | July 13, 1939 |

OTHER REFERENCES

Medical Record, "Superfluous Hair," by Marton, Feb. 19, 1936, page 153.

Lancet, article by Kalinowsky, Dec. 9, 1939, pp. 1232–7.

"Theory and Calculation of Electric Circuits," section 134, pp. 259, 260 and 261, first edition, 1917, by Steinmetz; published by the McGraw-Hill Book Company, New York, New York.

"Theory and Calculation of Alternating-Current Phenomena," fifth edition, 1946, section 64, pp. 76 and 77; also by Setinmetz and published by McGraw-Hill Book Co.

"Electricity and Electromagnetism," by Harnwell, 1938, published by McGraw-Hill Co.